Patented Apr. 11, 1944

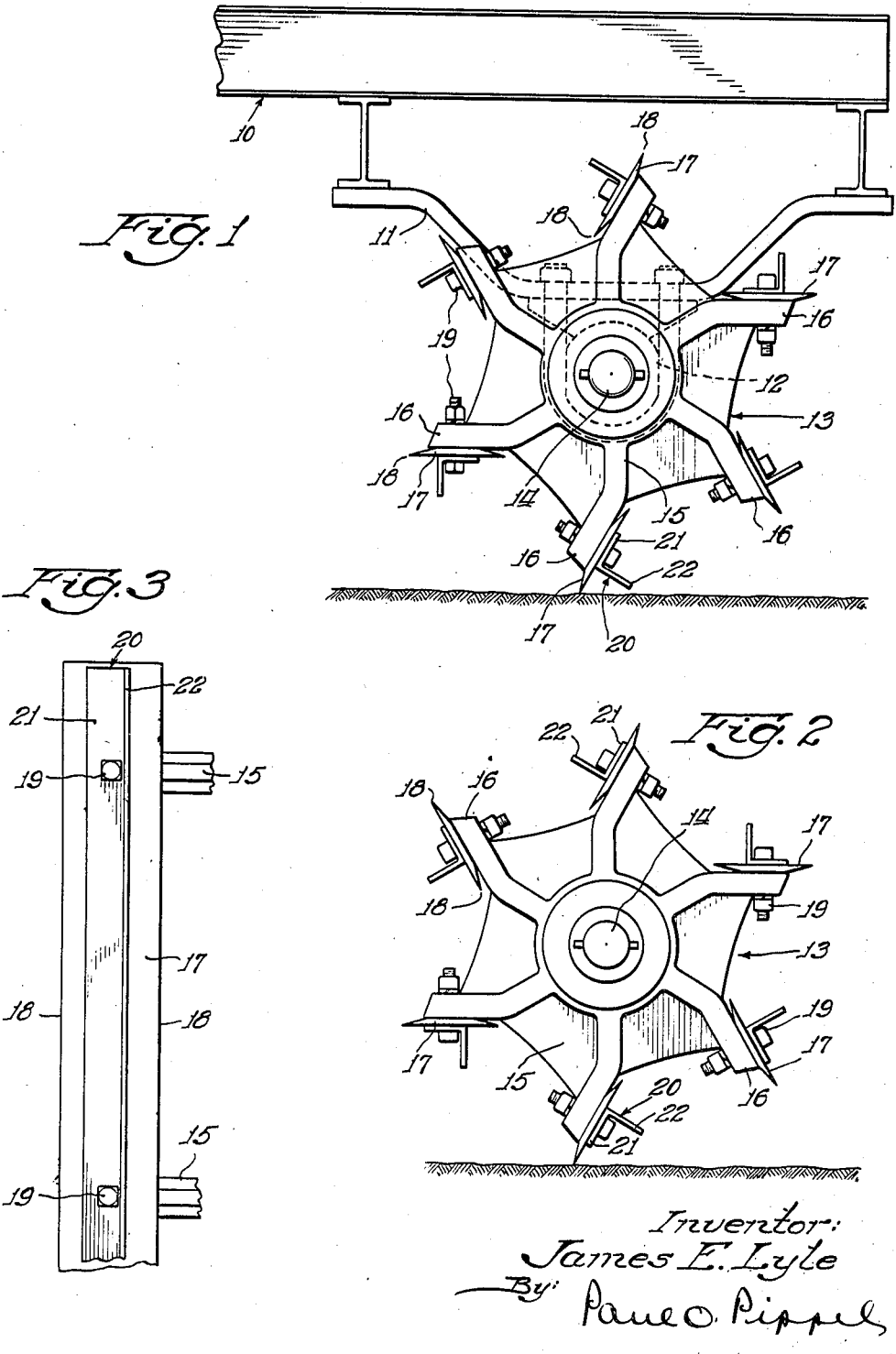

2,346,317

UNITED STATES PATENT OFFICE 2,346,317

STALK CUTTER

James E. Lyle, Canton, Ill., assignor to International Harvester Company, a corporation of New Jersey Application August 31, 1942, Serial No. 456,763

5 Claims. (Cl. 55—61)

This invention relates to a cutter and more particularly to a cutter of the type adapted to chop up stalks and other similar material. More especially the invention relates to means for regulating the depth of cut to be made by a cutter.

In the instance of an agricultural machine embodying a stalk cutter, the machine is operated over a field, the surface of which is covered with stalks of substantial lengths. The cutter usually comprises a rotatable element having a plurality of radially extending blades, and forward movement of the machine rotates the cutter so that the blades chop up or reduce the stalks lying on the ground.

It is the principal object of the present invention to provide means for regulating the depth or penetration of the cutting edges of the blades of a cutter and particularly a cutter of the agricultural type as referred to above.

An important object of the invention is to provide the regulating means in the form of a member carried by a cutter blade.

Another object is to provide a member that is reversible and having a portion thereby adapted for disposition at at least two different locations with respect to the cutting edge whereby the cutting blade may have greater or lesser penetration.

An another object is to provide the gauge or regulating means in the form of an angle bar having two flanges, one of which may be easily secured to the blade or cutter and the other of which may project from the blade in either of two positions to provide for the desirable depth or penetration control.

Other important objects and features of the invention will appear to those skilled in the art as the disclosure is more fully made in the following detailed description and accompanying sheet of drawing, in which:

Figure 1 is an elevational view of a cutter embodying a preferred form of the invention;

Figure 2 is a similar view showing the depth-control means in positions different from those shown in Figure 1; and Figure 3 is a view showing a portion of one of the cutter blades and its gauge bar.

For the purpose of illustration and description, the invention has been shown as embodied in a cutter forming a part of an agricultural machine. However, it will be understood that the invention may be suitably adapted in other instances, and accordingly, the present disclosure is to be taken as illustrative and not limiting.

As shown in Figure 1, the invention is embodied in a cutter forming part of an agricultural machine having a main frame 10 including depending supporting structure 11 providing bearing means 12 for the supporting of a cutter element indicated generally at 13.

The cutter 13 includes a shaft 14 disposed transversely with respect to the frame 10 and journaled in the bearing means 12. It will be understood that the bearing means includes a plurality of transversely spaced bearings and that the shaft 14 may extend a substantial distance across the frame 10. The cutter further includes at least a pair of transversely spaced spiders 15, each of which includes a plurality of radially extending arms or carrier members 16.

The carrier arms are spaced circumferentially and each carries a transversely extending cutter element or blade 17. Each blade is preferably provided with a pair of oppositely disposed cutting edges 18 so that one edge may be used when the other has become worn. The blades are secured to the cutter 13 by a plurality of securing means in the form of bolts and nuts 19.

The improved gauge or depth-control means provided according to the invention preferably consists of a plurality of individual elements carried respectively by the blades 17. The gauge element for one blade preferably comprises a member in the form of an angle bar 20 having a pair of flanges 21 and 22 disposed at right angles to each other. A flange 21 is preferably apertured to receive the securing means 19 that holds that blade to its carrier arm 16. Each angle bar may be arranged with respect to its blade 17 in either of two positions, in either of which the flange 21 of the bar lies along the blade 17 and is secured to the carrier by means of the securing means 19, while the other flange 22 extends outwardly and preferably at a right-angle to the face of the blade 17.

As shown in Figure 1, the angle bar 20 may be mounted on its blade 17 with the extending flange 22 disposed comparatively adjacent the operative cutting edge 18. The other angle bars 20 in the arrangement shown in Figure 1 are similarly disposed. In this position of the parts, the extending flanges 22 serve to control or regulate the depth or penetration of the blades 17. The arrangement in Figure 1 is such that the blades 17 may penetrate to an intermediate depth. As shown in Figure 2, the angle bars 20 have been reversed so that the extending flanges 22 are disposed respectively at greater distances from the operative cutting edges of the respective blades 17, in which case each blade may have substantially maximum penetration. In this manner the angle bars serve in either of their positions to control the depth to which the blades 17 may penetrate as the machine travels over the ground.

One of the important features of the invention, as previously stated, is the provision by which the regulating or control means are carried by the blades of the cutter. This structure eliminates the necessity for separate gauge means or supporting means to carry the frame of the machine. In the present instance, the weight of the frame may be taken on the cutter, the extending flanges 22 of the angle bars serving to prevent undesirable penetration by the blades 17. Another important feature of the invention is the reversibility of the angle members 20, by means of which a plurality of positions may be obtained for regulating or gauging depth or penetration. Still further, it is to be noted that each blade and its gauge or regulating bar is secured to the cutter 13 by the same securing means. Thus there is provided an arrangement by which the bars 20 may be conveniently removed and reassembled to alter its position with respect to the operative cutting edge of the blade 17.

Other features of the invention will undoubtedly suggest themselves to those skilled in the art, but it will be understood that the present disclosure is of only a preferred embodiment of the invention and that numerous modifications and alterations may be made therein without departing from the spirit and scope of the invention as defined in the appended claims.

What is claimed is:

1. In a cutter having a plurality of blades provided with cutting edges for cutting material, means for gauging the depth of the cut to be made by the blades comprising angle bars having first and second angled portions, and means for reversibly securing each of said bars by one of its portions to each of said blades with its second portion at an angle to each of the blades and adapted to be disposed at either of two distances from the cutting edge of each of the blades.

2. In a cutter having a plurality of blades provided with cutting edges for cutting material, means for gauging the depth of the cut to be made by the blades comprising a member arranged along each blade and having a gauging portion, and means mounting said member parallel to and on each of the blades for reversibility of said member for positioning of the gauging portion at either of two distances from the cutting edge of the blade.

3. In a cutter having a carrier, a plurality of blades each having a cutting edge, gauge members for gauging the depth of cut of said blades, said members comprising angle bars having first and second angled portions and adapted to be arranged with the first portion lying in abutting relation along the blades and the second portion angled outwardly from the blades, said bars being reversible on the blades to dispose the second portion at either of two distances from the cutting edges of the blades, and means securing the bars and blades to the carrier.

4. For an agricultural machine having a frame and a rotary cutter substantially as wide as said frame, blades on said cutter having a cutting edge adapted to engage material on the ground over which the machine travels: a plurality of gauge members substantially the width of the cutter, one for each of said blades for gauging the penetration of said blades, a member being arranged along each of said blades; and means mounting said member on each of said blades for positioning of said member at selected distances from the cutting edge of each of said blades.

5. For an agricultural machine, a frame having radially extending carrier members and a rotary cutter including blades and having a cutting edge adapted to engage material on ground over which the machine travels: a plurality of gauge members, one for each of said blades for gauging the penetration of said blades, a member being arranged along each of said blades; said member comprising an angle bar having first and second angled portions and adapted to be arranged with the first portion lying along each of the blades and the second portion angled outwardly from each of the blades, said bar being reversible on the blades to dispose the second portion at either of two distances from the cutting edge of the blades, and means securing the bar to the carrier members.

JAMES E. LYLE.